J. Straus,
Side Saddle Tree.
No. 93,843. Patented Aug 17. 1869.
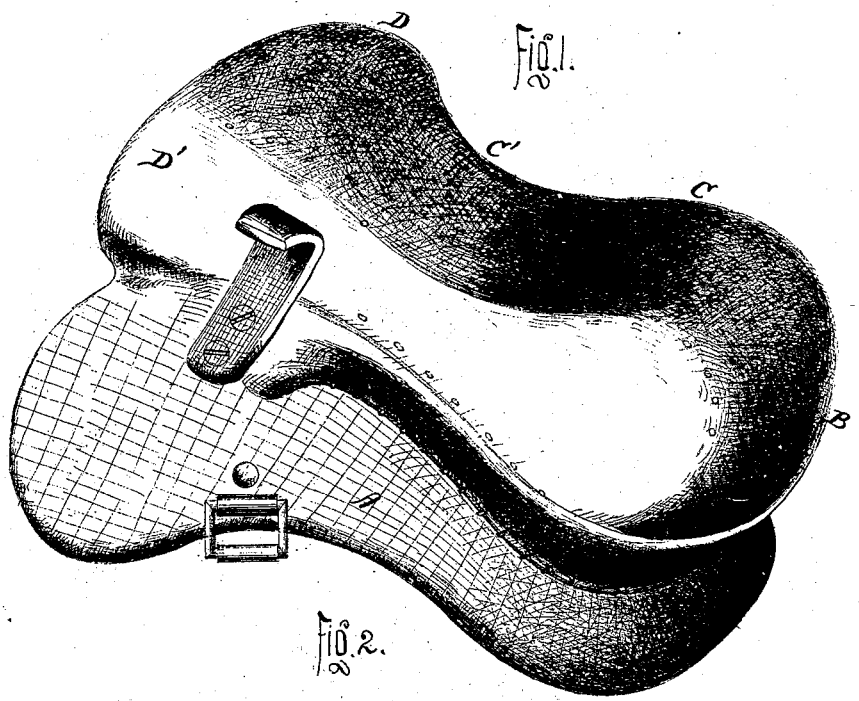
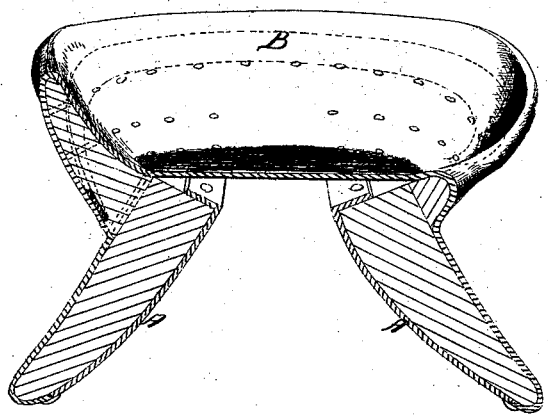
Witnesses:
Victor Hagmann.
Solon C. Kemon.
Inventor:
J. Straus
by Kemon & Co

United States Patent Office.

JACOB STRAUS, OF ST. LOUIS, MISSOURI.

Letters Patent No. 93,843, dated August 17, 1869.

---

IMPROVED SIDE-SADDLE TREE.

---

The Schedule referred to in these Letters Patent and making part of the same.

---

*To all whom it may concern:*

Be it known that I, JACOB STRAUS, of the city and county of St. Louis, and State of Missouri, have invented a new and improved Side-Saddle Tree; and I do hereby declare that the following is a full, clear, and exact description of the construction and operation of the same, reference being had to the accompanying drawings, making a part of this specification, in which—

Figure 1 is a view in perspective, and

Figure 2 is a transverse vertical section.

This invention consists in combining, in one tree, a cantel, a back-rail, a back-spring, and an extension spring, in such a manner as to form a continuous flange along the off and back sides of the tree, so that the latter, when covered with raw hide, forms a saddle in itself sufficient for all ordinary purposes, and is, at the same time, a perfect tree, upon which a saddle of any sort, and of the most desirable shape, may be built up by an ordinary saddler.

In the drawings—

A A are the bars, of the kind called Spanish.

B is the cantel, starting at the usual point of the near side of the tree, and running thence around in one continuous piece, of nearly uniform width, to the off horn D.

In the ordinary tree, the cantel is only found at the rear end, and between the cantel and the off horn is a vacancy, which is filled in by the saddler, who adds the rail C and back-spring C', separate and distinct parts from the tree. My method of construction attracts these parts from the saddle, and puts them into the tree.

The off horn D of my tree has, also, the novelty of having the "extension-spring" D' formed in one piece with it. Usually, this part, like the rail and back-spring, is wanting in the tree, and supplied by the saddler.

By making a tree combining in itself all the several parts that have heretofore been partly in the tree and partly in the saddle, I produce an article, that when covered with raw hide, or other suitable material, forms a complete saddle, as good as needed for ordinary purposes.

The cantel and off horn are at first glued to the bars. I then apply around the outside of the cantel, up and down the outside of the off horn, and up and down the inside of the bars, near the front end, iron braces, *a b c*, which I let into the wood, so that their outer surfaces will be flush with the surface of the wood.

The raw hide is stretched across the bars, so as to form a full seat, the bars keeping it so far above the horse's back that not only is there no danger of galling it, but a free passage is made for the ingress of air between the bars and under the raw hide, whereby the animal's back is kept cool.

The continuous rail, formed by the parts B, C C', and D, affords the rider a comfortable seat, by offering support to the back, also secures her against being thrown, and prevents her from slipping too much to the off side, and thus causing the saddle to turn.

She is also enabled to brace herself against the rail, by pressing upon the stirrup with her foot, and thus ride firmly, and with little jolting.

A continuous rail has heretofore been attached only to the most expensive saddles; but, by forming the tree with a continuous rail, and thus making a saddle of the tree itself, it may be manufactured at so little cost as to bring it within the use of the poorest.

Having thus described my invention,

What I claim as new, and desire to secure by Letters Patent, is—

As an article of manufacture, a side-saddle tree, formed with a complete seat, the continuous rail B, C C', D, and the extension spring D', the whole covered with hide, or other equivalent material, and shaped, arranged, and operating substantially as described.

JACOB STRAUS.

Witnesses:
 JAMES H. GRIDLEY,
 SOLON C. KEMON.